Figures 1, 2, 3:
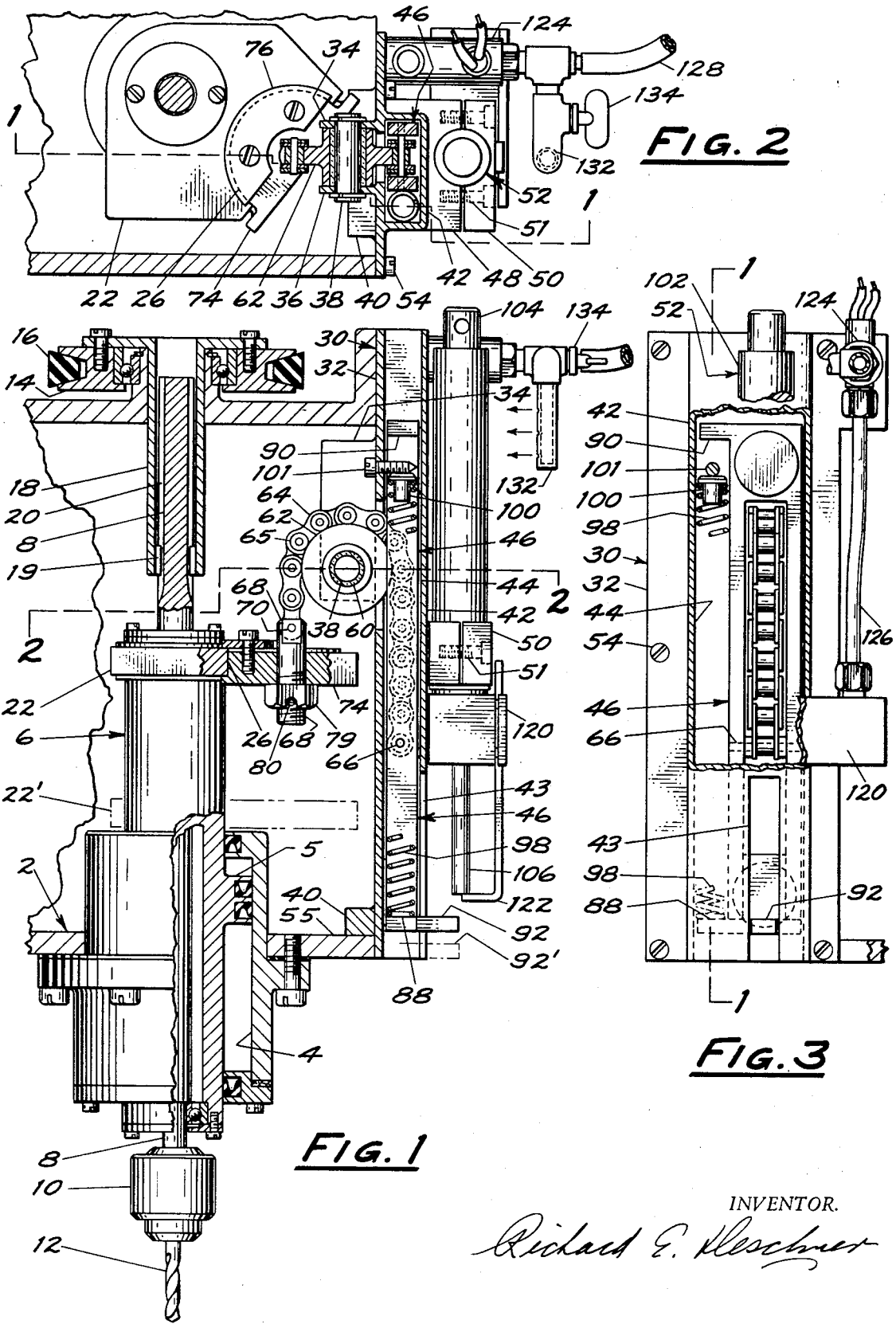

United States Patent

Deschner

[15] 3,704,074
[45] Nov. 28, 1972

[54] OFFSET FEED CONTROL

[72] Inventor: Richard E. Deschner, 5550 Harcross Drive, Los Angeles, Calif. 90043

[22] Filed: June 11, 1971

[21] Appl. No.: 152,202

[52] U.S. Cl.....................................408/11, 408/130
[51] Int. Cl. ............................................B23b 47/22
[58] Field of Search....................408/10, 11, 17, 130

[56] References Cited

UNITED STATES PATENTS

| 3,299,783 | 1/1967 | Mazue | 408/11 X |
| 2,957,374 | 10/1960 | Djidich et al. | 408/11 |
| 2,692,660 | 10/1954 | Good et al. | 408/130 |

Primary Examiner—Gil Weidenfeld

[57] ABSTRACT

This disclosure describes a hydraulic feed control for reciprocative machines which rotate and feed a tool-bit into a workpiece.

14 Claims, 7 Drawing Figures

INVENTOR.
Richard E. Kleschner

INVENTOR.
Richard E. Fleschner

OFFSET FEED CONTROL

CROSS REFERENCE TO RELATED PATENT

The type of hydraulic check unit described in U.S. Pat. No. 3,027,152, and the type of clutching device described in co-pending patent application Ser. No. 97,667 filed Dec. 14, 1970, are preferably used in the invention described herein because that combination is leakproof and reliable.

BACKGROUND OF THE INVENTION

1. Field of the Invention

Although the invention will be described as used in conjunction with an automatic drilling machine, its field of usefulness includes any tool feeding machines having reciprocative mechanisms.

2. Description of the Prior Art

Automatic drilling machines are used extensively in present day machine shops for mass production work. Such machines, when triggered to operate, rotate a drill-bit and feed it into a workpiece to produce a hole.

The common type of automatic drilling machine comprises a rotative spindle supporting a chuck for gripping drill-bits. The spindle is reciprocated by a pneumatic cylinder which is charged with compressed air at one end to advance the spindle and feed the drill-bit into a workpiece, and charged on the other end to retract the drill-bit from the complete hole. However, compressed air provides a force which is very resilient, and if uncontrolled, tends to feed a drill irregularly and to advance the drill spindle so rapidly throughout its feeding stroke that it causes the drill-bit to strike the workpiece with heavy impact. The impact is great enough to break small drill-bits, and therefore, most, if not all, pneumatic drilling machines are arranged to be equipped with an optional hydraulic check unit of some kind which can be adjusted to control the speed of advance of the drill-bit.

A hydraulic check unit applied resistive control force to the reciprocative spindle mechanism of a drilling machine to control the feed rate. The resistive force is applied parallel to the direction of reciprocation. The configuration of a spindle mechanism is such that the sliding bearings which support it and permit it to reciprocate, are concentric with the rotative spindle, and since a hydraulic check cannot ordinarily be mounted in direct alignment with the spindle centerline, it must be mounted at some point spaced radially from said centerline, the result being that the resistive force tends to cant the spindle mechanism in its bearings. The farther the resistive force is applied from the spindle centerline, the greater the canting force and resultant wear on the sliding bearings. Of course such wear eventually results in looseness and misalignment of the spindle and of the drill-bit.

SUMMARY OF THE INVENTION

The present invention provides a means of applying the resistive control force close to the said spindle centerline to minimize misalignment and wear, while permitting the hydraulic check unit itself to be mounted in an offset position at a greater radial distance from said spindle centerline to accommodate its bulk and simplify its installation. The resistive force is transmitted from the offset check unit to the spindle mechanism via a flexible sinuous transmissive member such as a chain or cable or steel tape. The preferred embodiment of the invention, as described herein employs a chain, and has the following characteristics:

1. Can be manufactured with a frame particularly constructed for attachment to any certain model of drilling machine so it may be sold as an accessory ready for installation without requiring alteration of said drilling machine.
2. Quickly mountable or demountable.
3. Permits all operations of which the drilling machine is originally capable.
4. May be equipped with the hydraulic check and clutch described in co-pending patent application Ser. No. 97,667 to provide maintenance free, leakproof feed control, and to permit 'peck drilling'.
5. Does not interfere with the working area of the drilling machine.
6. Operates equally well in all possible positions of the drilling machine.

Figure 5:
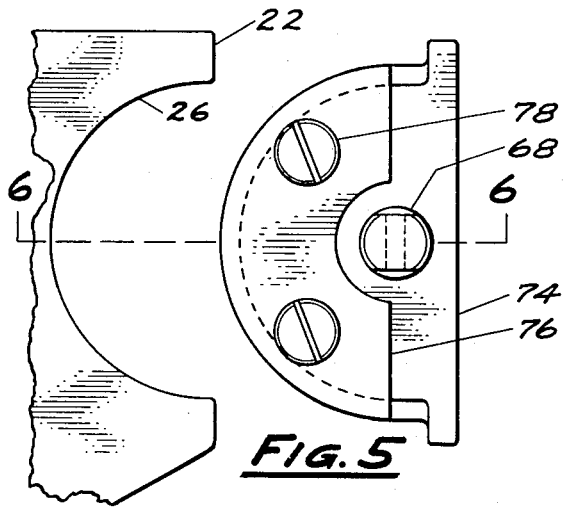
Figure 4:
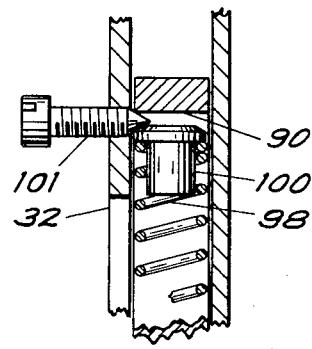
Figure 6:
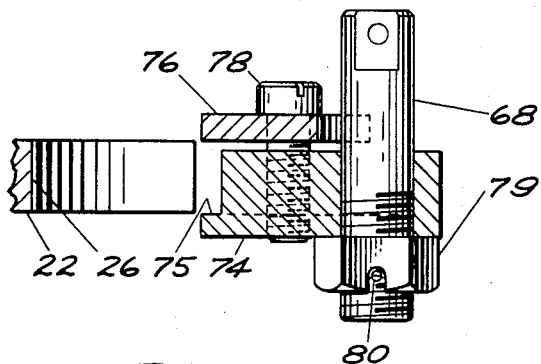

In the drawings:

FIG. 1 is a fragmentary front elevational view of an automatic drilling machine showing an attached offset feed control embodying the principles of this invention, the view being broken away at various planes to show the rim of wheel 62, the swivel arbor 68, and a section of the pneumatic cylinder 4. The portion of the view showing the side of slide 46 and the stop screw 101, is broken approximately at lines 1—1 of FIGS. 2 and 3, FIG. 2 is a sectional plan view of the feed control taken approximately at line 2—2 of FIG. 1 showing the semi-disc 74 and arcuate plate 76 of the anchor means attached to the contoured plate 22 of the drilling machine, FIG. 3 is a side elevational view of the feed control of FIG. 1 omitting mounting blocks 48 and 50, air blast tube 132, and manual valve 134. The clutching device 120 and a portion of channel 42 are broken away to reveal some of the inner details of construction, FIG. 4 is an enlarged detail of the stop screw 101 of FIG. 1 showing how it enters between the slide extension 90 and the spring headpiece 100 when being initially installed, FIG. 5 is an enlarged plan view of the anchor means of FIG. 2, showing how it appears just before it is attached to the contoured plate 22, FIG. 6 is a sectional elevational view of the anchor means taken at line 6—6 of FIG. 5, and, FIG. 7 is a perspective view of the slide 46 per se, broken away to show the mounting of inset bearing pad 96.

DESCRIPTION AND OPERATION OF PREFERRED EMBODIMENT

In FIG. 1, numeral 2 indicates a primary frame which is the basic structure of an automatic drilling machine. The frame supports a pneumatic cylinder 4 through which a reciprocative mechanism 6 extends carrying a rotative spindle 8 and attached chuck 10 holding a tool-bit 12. A pulley 14 driven by a belt 16 carries a flanged tube 18 which contains splines 19 engaging splines 20 on spindle 8, enabling the spindle and chuck to be rotated by said pulley while being reciprocated piston 5 in the pneumatic cylinder. A contoured plate 22, which forms a part of the reciprocative mechanism, travels from a high position 22 to a low position 22', its concave shape at 26 (see also FIG. 2) being provided on the type of drilling machine illustrated, to accept the body of the drilling machine manufacturer's checking device, the operation of which is briefly described under "Description of the Prior Art" in patent application Ser. No. 97,667.

Figure 7:
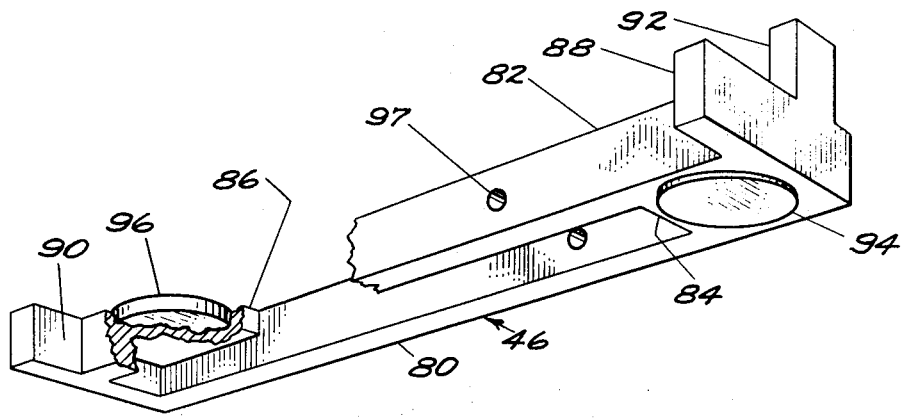

Referring now to the preferred embodiment of the present invention shown in FIGS. 1–3, numeral 30 indicates a secondary frame which is the basic structure of the present invention and includes a base plate 32, attached plates 34 and 36 supporting an axle 38, a thrust lug 40, an attached channel 42 slotted at 43 and forming with base plate 32 a race 44 containing a movable longitudinal slide 46 (the slide is shown in detail in FIG. 7.) A base block 48 is secured to the baseplate and channel, and a removable cover block 50 is held in place by screws 51 to support a hydraulic check 52. The said secondary frame is demountably attached to the said primary frame of the drilling machine by means of screws 54, the thrust lug 40 bearing against the lower plate 55 of the primary frame to prevent any shearing action on screws 54 due to loads transmitted to the secondary frame by the drilling machine.

Axle 38 utilizes a bearing 60 to support an idler wheel 62 which in turn supports the body portion 64 of a roller chain, the rollers 65 contacting the rim of the wheel. The primary end of the chain is secured to the aforementioned slide 46 by a pin 66, and a swivelable threaded arbor 68 is secured to the secondary end of the chain by pin 70. The enlarged drawings in FIGS. 5–6 show the arbor to be supported by a semi-disc member 74 having a flange portion 75, and a separate arcuate plate 76. The disc and plate are arranged to be clamped together by two screws 78 thereby forming an anchor means which is demountably attachable to the contoured plate 22. Referring again to FIG. 1, it will be seen that downward movement of the reciprocative mechanism of the drilling machine is transmitted through the chain and over idler wheel 62 to cause upward movement of slide 46, which in FIG. 1 is shown in a slightly raised position. Swiveling of arbor 68 is not necessary to operation of the invention, but facilitates installation of the feed control on the drilling machine. The slotted nut 79 permits adjustment of arbor 68 to remove looseness in the chain. A cotter pin 80 through the arbor prevents looseness of the nut.

As shown in detail in FIG. 7, the slide 46 per se comprises two longitudinal side bars 80 and 82 joined at their ends by solid portions 84 and 86 having three laterally extended portions 88, 90, and 92. The slide includes two inset bearing pads 94 and 96. During a working stroke, when the slide is being lifted by the chain against the resistance of the hydraulic check, the slide is subjected to a force couple which is resisted by the bearing pads as they slide within race 44. The bearing pads are preferably made of Nylatron or other abrasion-resistant self-lubricating material to give long wearing life. Aligned holes 97 provide support for pin 66 of FIG. 1.

The amount of movement of slide 46 is determined by the travel of the said reciprocative mechanism, a spring 98 being provided, as shown in FIGS. 1–3, with its lower end bearing against lateral extension 88 to prevent looseness in the chain and to return the slide downward when the reciprocative mechanism returns upward. The upper end of the spring bears against a headpiece 100 which preserves alignment of the spring, the headpiece in turn bearing against a stop screw 101 which is threaded through baseplate 32. In addition to holding spring 98 in place, the stop screw, which is shown in larger detail in FIG. 4, also acts as a stop for extension 90 of the slide to prevent ejection of the slide by the spring whenever the feed control is not attached to a drilling machine. The point of the screw facilitates the initial installation of the screw between extension 90 of the slide and headpiece 100 as shown in FIG. 4. As previously mentioned, FIG. 1 shows the slide and extension 92 in a slightly raised position. Numeral 92' indicates the lowest position to which the slide and extension 92 can travel.

The aforementioned hydraulic check 52 has a housing 102, a speed adjustment knob 104, and a fluid damped plunger 106 which is moved upward relative to the housing when slide 46 rises and lateral extension 92 strikes plunger 106. As explained in U.S. Pat. No. 3,027,152, movement of plunger 106 is resisted by the damping means within check 52 to a degree depending on the adjustment of knob 104, therefore the feed rate of the said reciprocative mechanism and chuck 10 are controllable by adjustment of knob 104. Plunger 106 automatically extends whenever it is freed of external forces, so that as the reciprocative mechanism 6 rises, plunger 106 automatically extends downward to be ready for the next feed stroke.

The housing 102 of the hydraulic check is made to accept attachment of a compressed air operated clutching device 120 and adjustable stroke limiter 122, both being of the type described in patent application Ser. No. 97,667. The said clutching device 120 makes the invention suitable for 'peck drilling' by applying frictional pressure to plunger 106 to grip the plunger and hold said plunger from extensional movement until said clutching device is released from the plunger by a pulse of compressed air received from the drilling machine control system. The said stroke limiter 122 permits the operator of the drilling machine to set the stroke of the hydraulic check to any length he wishes. As also explained in said application, for the preferred embodiment, an air valve is utilized to furnish timed pulses of compressed air for operating the clutching device. Ordinarily this valve would be of an electrically operated solenoid type adapted to be connected to the drilling machine control system by electric wires, and could be mounted either on the drilling machine or on the baseplate 32 of the present invention as shown at 124 in FIGS. 2– 3. An air tube 126 is then connected between the air valve and clutching device.

The present invention is improved by inclusion of the electric air valve already mounted on baseplate 32 and connected as described, because then the user is saved the effort of obtaining the valve separately and mounting it himself. The user has only to provide a supply air hose as at 128 in FIG. 2. Inclusion of the air valve mounted as shown provides an additional advantage because it furnishes a means of easily attaching an optional air blast tube 132 in position to direct one or more jets of compressed air onto the check housing 102 as shown by the three small arrows in FIG. 1. By this means, the hydraulic fluid may be kept cool to insure constancy of operation and to protect the rubber seals within the check housing, even though the feed control is cycled rapidly and under heavy loads. A small manually operated valve 134 gives a means of controlling the air jets.

In the embodiment of the invention shown in this disclosure, the preferred type of hydraulic check is shown to have a housing 102 which is stationary relative to the said secondary frame, the plunger 106 being movable. However, a check could be used in which the plunge remained stationary while the housing reciprocated, this being a type of check readily obtainable at industrial supply houses and operative on the present invention without appreciable change of function.

It is intended that the present disclosure is for the purpose of illustration only and that this invention include all modifications, reversals, and equivalents which come within the scope of the subject matter claimed.

What is claimed is:

1. An accessory device for mounting a hydraulic check on that type of machine have a reciprocative mechanism with a rotative spindle for rotating and feeding tool-bits into a workpiece, said spindle having an axis, said machine having a primary frame supporting said reciprocative mechanism, said machine being provided with a flexible, sinuous, force transmissive member having two ends, said mechanism including a coupling surface to which one end of said sinuous member may be coupled, said check having a housing and a fluid-damped plunger reciprocative relative to said housing, said plunger having a receptive surface adapted to receive external forces capable of moving said plunger, said accessory device comprising: a secondary frame demountably attachable to said primary frame, a support structure carried by said secondary frame and adapted to hold said hydraulic check in an offset position relative to said mechanism, which said receptive surface laterally spaced from the centerline of said spindle, force translocative means for transmitting movement from said sinuous member to said receptive surface and comprising: a movable, engageable member having a working stroke substantially in a plane parallel to the direction of movement of said plunger and having an impeller portion positioned in engageable alignment with said receptive surface; there being means provided on said engageable member for attaching the other end of said sinuous member, and bearing means supported by said secondary frame for retaining and guiding said engageable member, said coupling surface being in a position nearer the axis of said spindle than said receptive surface occupies.

2. The subject matter of claim 1, said bearing means including a race, said engageable member being of greater length than width and arranged to slide longitudinally within said race, said engageable member having structure at each end supporting at least one abrasion-resistant slidable pad which bears against the surface of said race to resist canting moments due to forces transmitted through said engageable member.

3. An accessary device for mounting a hydraulic check on that type of machine having a reciprocative mechanism for rotating and feeding tool-bits into a workpiece, said check having a housing and a fluid-damped plunger reciprocative relative to said housing, said plunger having a receptive surface adapted to receive external forces capable of moving said plunger, said mechanism including a rotative spindle having an axis, said machine having a primary frame supporting said mechanism, said accessory device comprising: a secondary frame demountably attachable to said primary frame, a support structure carried by said secondary frame and adapted to hold said hydraulic check in an offset position with said receptive surface laterally spaced from the centerline of said spindle, force translocative means for transmitting movement from said reciprocative mechanism to said receptive surface and comprising: a movable, flexible, sinuous, force transmissive member having a body portion and primary and secondary ends, there being a longitudinal centerline extending throughout its length, bearing means attached to said secondary frame for supporting and guiding the body portion of said sinuous member; a movable, engageable member having a working stroke substantially in a plane parallel to the direction of movement of said plunger and having an impeller portion positioned in engageable alignment with said receptive surface; bearing means supported by said secondary frame for retaining and guiding said engageable member; means securing said sinuous member at its primary end to said engageable member, and anchor means shaped and constructed to fit a portion of the secondary end of said sinuous member and also a portion of said reciprocative mechanism and adapted to attach said secondary end to said reciprocative mechanism with the centerline of the secondary end of said sinuous member in a position nearer the axis of said spindle than said receptive surface occupies.

4. The subject matter of claim 3, said anchor means, subsequent to attachment of said secondary end to said reciprocative mechanism, including a swivelable member adapted to permit said sinuous member to swivel relative to said reciprocative mechanism about an axis parallel to the axis of said rotative spindle.

5. The subject matter of claim 3, said anchor means being adapted to be attached against the edge of a flat-faced member forming a part of said reciprocative mechanism, said member having two substantially flat and parallel faces, said edge extending between said faces and having a substantially semi-circular concave shape, said anchor means comprising: a base member shaped to fit within and contact said concave shape, said base member having attached thereto two flange portions shaped to overlie opposed portions of said flat faces, means adapted for drawing together said flange portions in a clamping action, said base member being provided with a bore, and a threaded arbor attachable to said sinuous member, said arbor being pivotally supported within said bore and supporting an adjustable nut against one of said plane faces.

6. The subject matter of claim 3, said accessory device including a compressed-air-operated clutching device for said plunger said clutching device being attachable adjacent said housing, and being constructively adapted to be connected by an air tube to a source of compressed air, said clutching device being of the type equipped with mechanism so constructed and arranged as to alternately grip and release said plunger when actuated by pulses of compressed air, there being resilient means operative to cause automatic extension of said plunger relative to said housing when said plunger is freed of external forces and said clutching device is released.

7. The subject matter of claim 3, said machine having an electrical control system, there being resilient means operative to cause automatic extension of said plunger relative to said housing when said plunger is freed of external forces, said accessory device including a compressed-air-operated clutching device for said plunger attached adjacent said check housing, said clutching device being of the type equipped with mechanism so constructed and arranged as to alternately grip and release said plunger when actuated by pulses of compressed air, said accessory device also including an electrically controlled valve adapted for transmitting pulses of compressed air to said clutching device, said valve being supported by said structure and constructively adapted to be connected by an air tube to said clutching device, by electrical conductors to said control system, and by an air hose to a supply of compressed air.

8. The subject matter of claim 7, and a cooling device comprising a manually operated valve and a jet tube provided with at least one aperture supported in position to permit air escaping from said aperture to impinge on said housing, said valve being adapted to regulate air flow to said jet tube, said valve being adapted to be connected to communicate with the inlet port of said electrically operated valve by tubing, thereby to be automatically supplied with compressed air whenever said electrically controlled valve is connected to said supply of compressed air.

9. Apparatus for adapting a hydraulic check for use on that type of machine having a reciprocative mechanism for rotating and feeding tool-bits into a workpiece, said check having a housing and a fluid-damped plunger reciprocative relative to said housing, said plunger having a receptive surface adapted to receive external forces capable of moving said plunger, said mechanism including a rotative spindle having an axis, said machine having a frame supporting said mechanism, said apparatus being supportable by said frame and comprising: force translocative means and structure adapted to retain said translocative means and to hold said hydraulic check in an offset relationship to said axis, said force translocative means comprising: a movable, flexible, sinuous, force transmissive member having a body portion and primary and secondary ends, there being a longitudinal centerline extending throughout its length, a reciprocative, engageable member having a working stroke substantially in a plane parallel to the direction of movement of said plunger and having an impeller portion disposed to engage said receptive surface secured to said plunger to move said plunger during said working stroke, bearing means adapted to retain and guide said sinuous member and said engageable member; means adapted to secure said sinuous member at its primary end to said engageable member, and anchor means shaped and constructed to fit a portion of the secondary end of said sinuous member and a portion of said reciprocative mechanism and adapted to secure said secondary end to said reciprocative mechanism with the centerline of the secondary end of said sinuous member in a position nearer the axis of said spindle than said receptive surface of the plunger occupies, so that movement may be transmitted from said reciprocative mechanism through said sinuous member and on through said engageable member to said plunger.

10. The subject matter of claim 9, and resilient means continuously urging said engageable member in a direction opposite to that of its working stroke to prevent looseness in said sinuous member.

11. The subject matter of claim 9, said bearing means adapted to retain and guide said sinuous member being an axle and a wheel rotative thereon.

12. The subject matter of claim 9, said flexible, sinuous member comprising a chain of hinged links, one of said links including a threaded element permitting adjustment in the working length of said link.

13. The subject matter of claim 9, said apparatus including a compressed-air-operated clutching device for said plunger, said clutching device being attachable adjacent said housing and being of the type equipped with mechanism so constructed and arranged as to alternately grip and release said plunger when actuated by pulses of compressed air, there being resilient means operative to cause automatic extension of said plunger relative to said housing when said plunger is freed of external forces and said clutching device is released.

14. The subject matter of claim 9, there being resilient means operative to cause automatic extension of said plunger relative to said housing when the plunger is free of external forces, said apparatus including a stroke limiter of the type having a stop portion held in overlapping engageable alignment with said receptive surface of the plunger by a columnar portion, said columnar portion being attached adjacent said check housing and being slidably adjustable parallel to the direction of movement of said plunger to limit the extension of said plunger a variable amount.

* * * * *